United States Patent [19]
Eisschiel et al.

[11] Patent Number: 5,955,882
[45] Date of Patent: Sep. 21, 1999

[54] MAGNETIC POSITION MEASURING DEVICE USING A PLURALITY OF SENSORS AND A SCALE

[75] Inventors: Heinz Eisschiel, Ostermiething; Victor Vasiloiu, Braunau, both of Austria

[73] Assignee: AMO GmbH, Braunau, Austria

[21] Appl. No.: 08/648,062

[22] PCT Filed: Nov. 17, 1994

[86] PCT No.: PCT/AT94/00173

§ 371 Date: May 17, 1996

§ 102(e) Date: May 17, 1996

[87] PCT Pub. No.: WO95/14213

PCT Pub. Date: May 26, 1995

[30] Foreign Application Priority Data

Nov. 17, 1993 [AT] Austria ........................................ 40345

[51] Int. Cl.⁶ ............................................................. G01B 7/14
[52] U.S. Cl. .................................. 324/207.21; 324/207.24; 324/262
[58] Field of Search ............................. 324/207.21, 207.2, 324/207.23, 207.24, 207.25, 173, 174, 252, 262, 225, 261; 338/32 R, 32 H; 341/15; 360/113

[56] References Cited

U.S. PATENT DOCUMENTS

| | | | |
|---|---|---|---|
| 4,785,241 | 11/1988 | Abiko | 324/262 |
| 4,866,382 | 9/1989 | Carmen | 324/252 |
| 5,047,716 | 9/1991 | Katagiri | 324/207.21 |
| 5,198,762 | 3/1993 | Shimoe et al. | 324/207.21 |
| 5,436,560 | 7/1995 | Murakami | 324/207.21 |

FOREIGN PATENT DOCUMENTS

| | | |
|---|---|---|
| A-0 048 983 | 4/1982 | European Pat. Off. . |
| A-093 232 | 11/1983 | European Pat. Off. . |
| A-0 235 750 | 9/1987 | European Pat. Off. . |
| 1326955 | 4/1963 | France . |
| 2664691 | 1/1992 | France . |
| A 32 14794 | 11/1983 | Germany . |
| 3704729 | 8/1988 | Germany . |
| OS 37 04 729 | 8/1988 | Germany . |
| OS 38 27 113 | 2/1990 | Germany . |
| OS 39 26 328 | 2/1991 | Germany . |

*Primary Examiner*—Jay M. Patidar
*Attorney, Agent, or Firm*—Pillsbury Madison & Sutro LLP

[57] ABSTRACT

A magnetic position measuring device includes a sensor and a scale. At least one of the sensor and scale is movable in relation to the other. The sensor includes four sensor elements positioned along a longitudinal axis parallel to the direction of the movement. The scale is made of alternating and repeating first and second sections. The first sections have a first reluctance and the second sections have a second reluctance. The first sections each have a length "l" and the second sections each have a length "s". The Sensor includes a field plate and four sensor elements positioned on the field plate along the longitudinal axis. The four sensor elements include first and second outer sensor elements and first and second inner sensor elements.

12 Claims, 3 Drawing Sheets

MAGNETIC POSITION MEASURING DEVICE USING A PLURALITY OF SENSORS AND A SCALE

This application claims benefit of international application PCT/AT94/00173, filed Nov. 17, 1994.

BACKGROUND OF THE INVENTION

1. Field of the Invention

The invention relates to a magnetic motion sensor. More particularly, the present invention relates to a length or angle measuring system having a sensor array, comprising several individual sensor elements, and a scale, whose reluctance varies periodically along its length. The sensor may be used, for example, in automation or numerical control applications.

2. Description of Background Information

Examples of magnetic motion sensing devices are disclosed in German Patent No. DE-A3,214,794 and European Patent Document EP 0,093,232 (Heidenhain). In these example devices, the sensors are Hall elements which deliver as measuring signals a Hall voltage. An electronic system is provided for conditioning the measuring signals.

The electronic system is complicated and needs at least six compensation resistors. In addition, the thermal behavior of the compensation resistors is different than that of the Hall sensors which presents a problem.

Additionally, the width of the sensors in the measuring direction is limited to a maximum of t/4 where t is the scale pitch. Therefore, a good sinusoidal waveform cannot be obtained from the measuring signals. If the sensor width is smaller than t/4, the magnetic flux will not change due to a displacement amount of t/4 while the sensor remains adjacent the same bridge or perforation.

This means that such an instrument can detect the position of a sensor only for a unit. As an example, consider a field plate, which can be displaced along a tooth rack. The whole system represents a closed magnetic circuit. A displacement of the field plate relative to the tooth rack causes a resistance value to change periodically, and this varying resistance value is used to determine the position and speed of the movement of the field plate. To avoid or minimize measuring errors, a field concentrator, or pole piece, is used to increase the signal amplitude. This sensor unit is large in size and requires the provision of an appropriate piece for mounting the tooth rack on the machine.

In German Patent document DE-OS-3,926,328, a similar device is presented. For increased accuracy, the device places more magnetic pole shoes along the measuring direction. This device is intended for use in digital calipers. The device includes an oversized measuring head in order to obtain a usable output signal. (See, for example, FIGS. 1 and 6 of DE-OS-3,926,328).

Another similar device is disclosed in DE-OS-3,704,729. A pole piece is attached to the sensor, and, with its alternating flux, induces a magnetic field in a tooth rack, which serves at the scale. The device produces a displacement-dependent signal in accordance with the position of the measuring head relative to the tooth rack along the measuring direction. This device has a complicated construction, is too voluminous, and is very sensitive to the distance between the measuring head and the tooth rack. These motion sensing devices suffer from significant limitations. Some comprise a scale having a tooth rack, with limited accuracy, due to a large resolution and measuring length. Others comprise a scale made of a thin film divided structure on a dielectric substrate, which delivers poor measuring signals due to the limited inductive changes along the scale. The fabrication of all these device types is expensive.

SUMMARY OF THE INVENTION

An object of the present invention is to provide a motion sensing device which does not have the above-described disadvantages and includes a small sensor and scale. It is possible to have these characteristics by providing a sensor having a field plate with four single sensor elements, and a thin scale, made of a continuous soft, steel tape with perforated or engraved grooves along its length. The field plate makes it possible to detect magnetic differences between grooves and bridges of the scale. The use of four single sensor elements makes it possible, through additional or differential connection of these sensors, to produce good sine wave signals (as a result of displacement along the scale) which varies symmetrically about zero. Such signals result in benefits during electronic processing. The sensor may comprise several magnetic resistors incorporated into a single unit called a field plate. The scale may have a fine pitch, be geometrically stable, and be made of corrosion-free material. The magnetic resistors may be simply excited with a single small powerful magnet. In accordance with these features, the following advantages can be achieved.

Each bridge of the scale can be scanned individually without requiring pole pieces or magnetic concentrators. No measuring errors will appear due to temperature changes. The measuring errors will not appear due to external, magnetic fields. Parameter drifts will not occur during long-term service. The grooves of the scale may be formed using a photolithographic technology or using laser or plasma cutting technologies. The grooves of the scale may also be punched, which can reduce costs. By providing a scale with grooves cut in one of these manners, the price of production of such a scale can be minimized in comparison to the state of the art. For example, cutting of a metal tooth rack is no longer necessary with such a feature.

The scale may comprise a soft steel tape which is less than 1 mm thick. More specifically, it may be about 0.2 mm thick.

BRIEF DESCRIPTION OF THE DRAWINGS

The invention is described in the appended drawings, wherein.

DETAILED DESCRIPTION OF EXEMPLARY EMBODIMENTS

Figure 1:
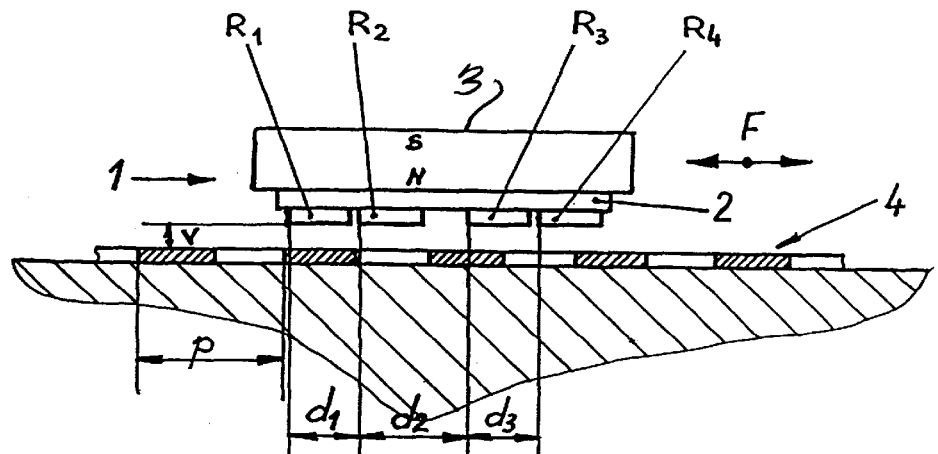
FIG. 1 is a side view of a measuring device in accordance with an embodiment of the present invention.

FIG. 1 shows a plate (sensor unit) 1 with four individual sensors (magnetic resistors) $R_1$, $R_2$, $R_3$, and $R_4$ which are mounted through a substrate 2 on a magnet 3.

Sensor unit 1 can be displaced along the direction F in relation to a scale 4. Sensors $R_1$, $R_2$, $R_3$, and $R_4$ can each comprise a single sensor or multiple sensors, connected in series and geometrically spaced relative to scale 4. Scale 4 can be mounted to a machine tool base, while sensor 1 is mounted to a machine tool slider so that it can be displaced relative to scale 4.

Figure 3:
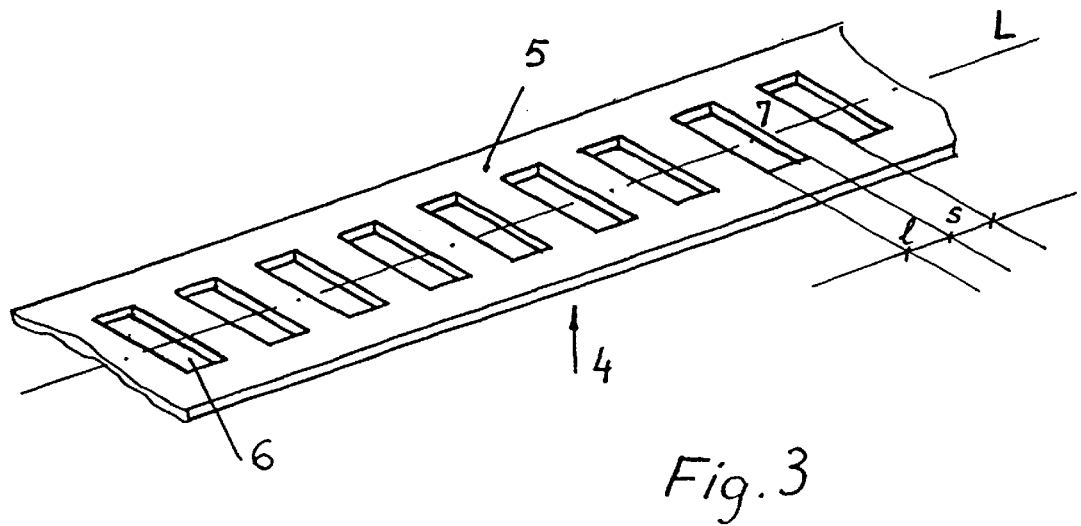
FIG. 3 is an isometric view of a scale.

FIG. 3 depicts scale 4 in more detail. As shown in FIG. 3, scale 4 comprises a tape 5 made of soft steel with a longitudinal axis L, which must not be symmetrical. Scale 4 includes plural rectangular grooves 6, separated by bridges 7. The width "l" of each groove 6 in the longitudinal direction is approximately equal to the width "s" of each bridge 7, so that s=l=p/2 where p is the pitch of the scale.

Referring again to FIG. 1, the sensors $R_i$ are geometrically placed on sensor unit 1, along the longitudinal direction L, with the following relative positions:

$d_1 = d_3 = (2k+1)p/2$ and $d_2 = kp - p/4$, where k is 0 or a positive integer, p is the pitch of the scale, $d_1$ is the distance between the outer single sensor and its neighbor, and $d_2$ is the distance between the inner pair of single sensors.

The sensors are arranged so that for the represented position of the sensor relative to the scale, an outer single sensor and its neighbor are over a groove 6 and a bridge 7 of the scale, while the other outer single sensor and its neighbor are positioned over the complimentary part of the scale. The pitch p is preferably about 1 mm. For a higher resolution, p can be smaller along the corresponding field plate. It is also possible to determine the geometry of the scale for existing field plates.

The width of each single sensor unit $R_i$ in the direction L is preferably p/2, so that l=s=p/2. Accordingly, the output signal of the sensor at the displacement relative to the scale will form a good sinusoidal wave.

Figure 2:
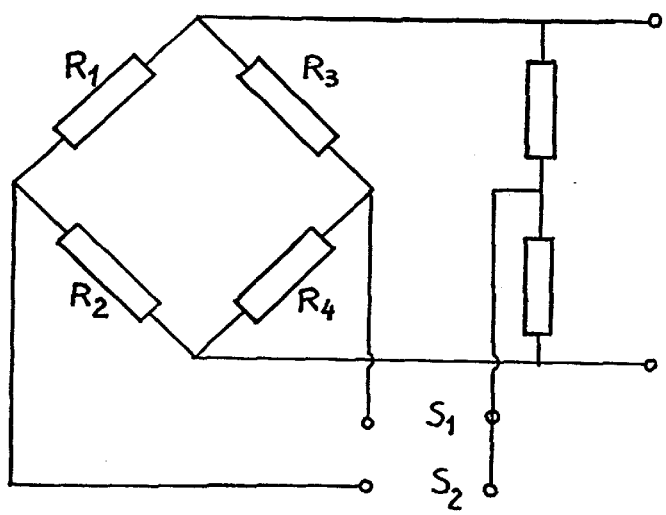
FIG. 2 illustrates a circuit for electrically connecting the sensors.

For the specified geometry, by connecting the output signals of the respective single sensors $R_1$, $R_2$, $R_3$ and $R_4$ as shown in the circuit of FIG. 2 (a common Wheastone bridge), two signals $S_1$ and $S_2$ having the same amplitude and a phase difference of 90° therebetween can be obtained when there is a displacement of the sensors relative to the scale. Geometric deviations of approximately 10% are acceptable without affecting the measuring accuracy.

The vertical distance V between the sensor and scale can be between 0.2 mm and 1 mm, and is preferably about 0.6 mm. When the distance V is too small, deformations of the signals appear at the relative displacement sensor-scale, due to the appearance of harmonics. When the distance V is too large, a loss in signal amplitude will occur; however, the illustrated device is not overly sensitive to the distance V as are conventional devices.

Figure 4:
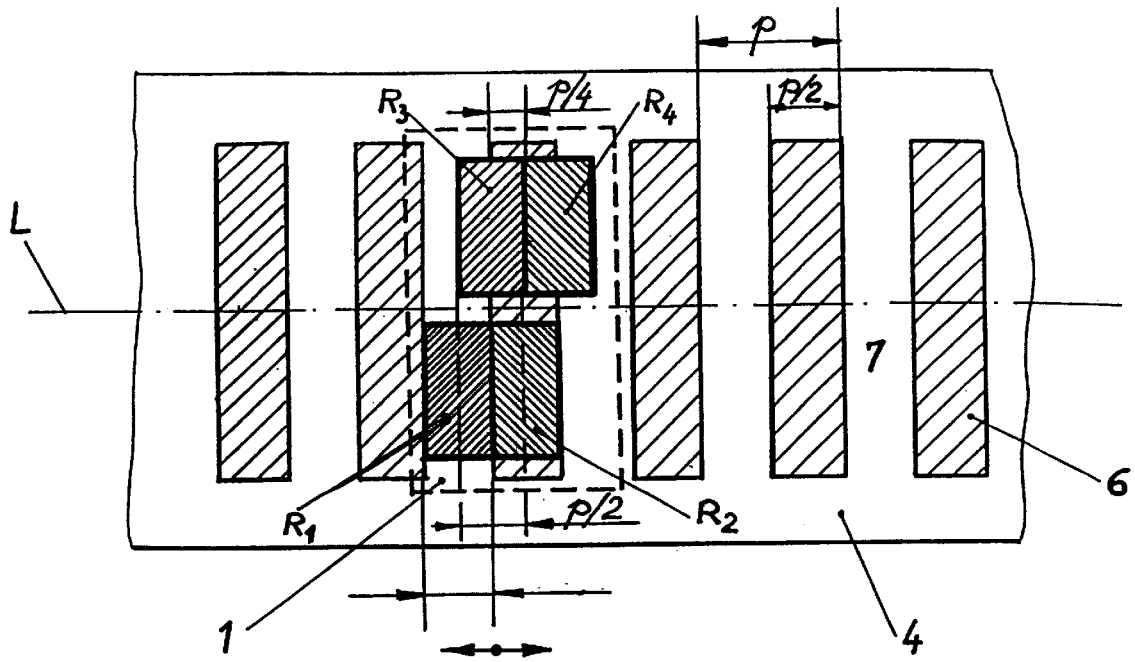
FIG. 4 illustrates an optional pattern of the device of the present invention.

Conventional circuits can be used to evaluate the signals $S_1$ and $S_2$. An alternative arrangement of the device is presented in FIG. 4 where $d_2$ is defined in accordance with k being zero. Longer grooves are provided in scale 4 in comparison to the single sensors $R_i$, making it possible to minimize the size of sensor 1 along the direction L because the single sensors $R_3$ and $R_4$ can be placed in a direction perpendicular to the direction L and thus alongside of single resistors $R_1$ and $R_2$.

The invention is not limited to the specific embodiments illustrated. Rather, it may be varied in different ways. For example, the pitch p (which will effect the frequency of signals $S_1$ and $S_2$) may be adapted for different applications, and for different sensor sizes (where the value of the variable k is large).

The illustrated device can be used for position or speed measurements in various applications. For example, it may be implemented in crane bridges, and so on. Generally, the device of the present invention can be used in any system in which it is necessary to make a displacement evaluation. The path of movement may be a rectilinear or curved. Since the scale is flexible, it is possible to measure relative positions for curved paths, as long as the appropriate vertical and lateral distance between the elements of the device are appropriately maintained.

Figure 5:
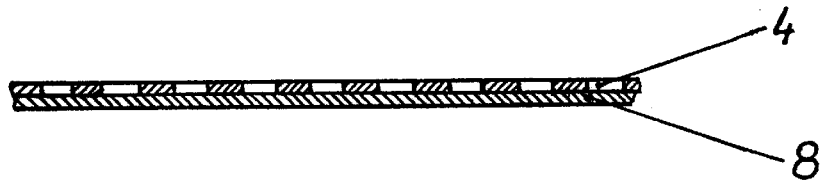
FIG. 5 is a cross-section of the scale.

In one preferred modification of the illustrated embodiments, scale 4 may be mounted on a support (8) which is a continuous soft steel tape, in order to minimize the influence of the base material on which the scale is mounted. This further shields against disturbant magnetic fields. This is shown in FIG. 5. Scale 4 may be glued or spot welded to support tape 8.

In order to decrease the sensitivity of the amplitudes of the output signals to the changes in the vertical distance between the sensors and the tape, the sensors may be compensated. The sensors may comprise magnetic resistors. A compensation sensor scans a domain of the scale 4 where the reluctance does not change. Preferably, the compensation sensor is integrated into the measuring head or attached thereto.

A compensation signal from such a compensation sensor gives information only about the distance between the measuring head and scale. Other influences will have the same effect on compensation, and the measuring signal may be neglected. The compensation signal may be taken into account by the signal conditioning electronic system.

The scale may be protected with a cover coating (plastic foil) against foreign particles. In this case, the vertical distance V is measured from the surface of the soft iron measuring scale.

The width of the scale may be freely determined, considering that the minimum width of the grooves 6 which is perpendicular to the direction L is limited by the size of the sensors which must be positioned in the middle of the grooves. Minimizing the scale width also reduces the influence of the border regions of the scale.

The width of scale depends upon the lateral limits of the measuring track, the mechanical and geometric conditions of the application, and whether a compensation and/or a reference track are used.

It is possible to obtain absolute positional information by using several parallel scales with different pitches, which can be scanned from different sensors in the same measuring head. This can also be obtained by using a single scale with several measuring tracks.

Figure 6:
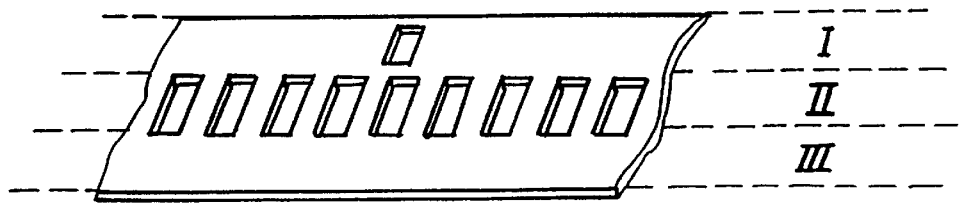
FIG. 6 is an isometric view of a scale having a different shape.

In a specific case, an additional track may be provided with only one or a few grooves for the determination of absolute positions, for example, as shown in FIG. 6. The track shown in FIG. 6 includes (I) a reference track, (II) a measuring track, and (III) a blank track for a compensation signal. Track I includes a single reference groove as shown in FIG. 6.

The scale may be mounted to a machine base by using adhesives or other methods. The attachment point may preferably be outside of the sensitive tracks, so that the measuring signals are not influenced. Such attachment methods can include spot welding, threaded fasteners, or riveting.

The grooves within the tape are not limited to a rectangular shape. They may be shaped differently, including an oval, circular and rhombic shape. Such shapes are preferred, for example, by conveyor or feed belt, and can be used for the driving and positioning of the belt.

Geometric configurations of the groove parameters different from l and s may be appropriate, where those parameters have a correlation to the l and s parameters as described above.

Figure 8:
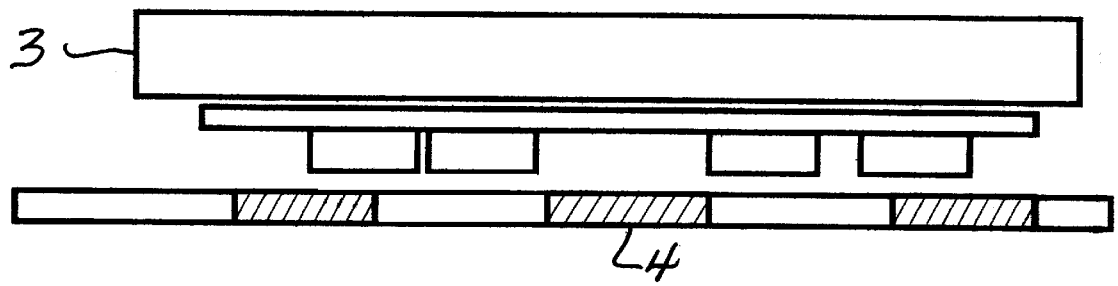
FIG. 8 is a view of a specific form of the tape.
Figure 7:
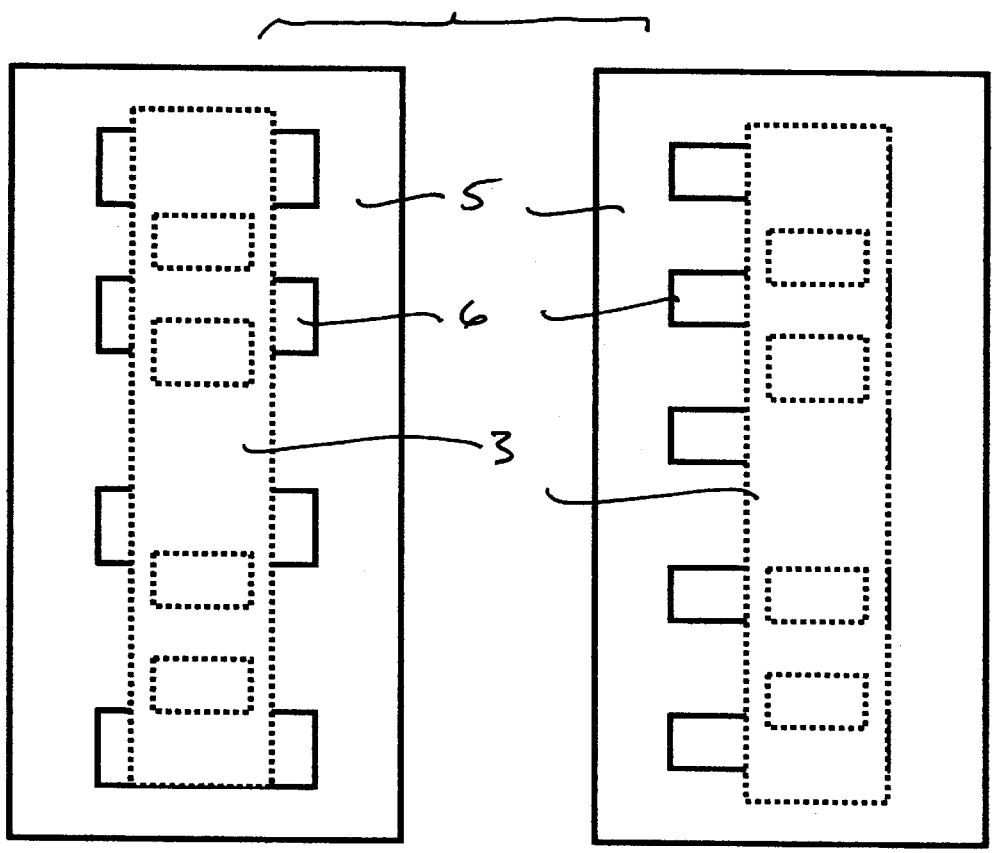
FIG. 7 is an isometric view of two scale portions each having a sensor.

FIG. 7 is a prospective view of the invention using a plurality of scales each with its own sensor with the scales being arranged in parallel, as shown. In FIG. 8, a particular embodiment of the tape having thickness and width dimensions substantially equal to the thickness and width dimensions of the scale is illustrated. As shown, the scale will have a thickness on the order of 0.2 millimeters.

We claim:

1. A magnetic positioning measuring device comprising a sensor and a scale, at least one of said sensor and said scale being movable in relation to the other of said sensor and said scale, said sensor comprising four sensor elements positioned along a longitudinal axis parallel to a direction of said movement, said scale comprising alternating and repeating first and second sections, said first sections having a first reluctance and said second sections having a second reluctance, said first sections each having a length "l" along said longitudinal axis and said second sections each having a length "s" along said longitudinal axis;

said sensor comprising a field plate and said four sensor elements positioned on said field plate along said longitudinal axis, said four sensor elements comprising first and second outer sensor elements and first and second inner sensor elements, said first outer sensor element being closer to said first inner sensor element than said second outer sensor element, and said second outer sensor element being closer to said second inner sensor element than said first sensor element;

each of said four sensor elements comprising a first edge facing a first direction along said longitudinal axis and a second edge facing a second direction opposite said first direction along said longitudinal axis, positions of said four sensors along said longitudinal axis being defined as follows:

$d_1=d_3=(2k+1)p/2$, and $d_2=kp-p/4$ wherein k is one of a positive integer and zero, $p=s+l$ is the pitch of said scale, $d_1$ is a distance between said first edge of said first outer sensor element and said first edge of said first inner sensor element, $d_3$ is a distance between said first edge of said second outer sensor element and said first edge of said second inner sensor element, and $d_2$ is a distance between respective said first edges of said first and second inner sensor elements.

2. The magnetic position measuring device according to claim 1, wherein each of said four sensor elements is connected in a Wheatstone bridge having first, second, third and fourth points of connection, said first outer sensor element being connected across said first and fourth points of connection, said second outer sensor element being connected across said second and third points of connection, said first inner sensor element being connected across said fourth and third points of connection, and said second inner sensor element being connected across said first and second points of connection;

a supply voltage applied across said first and third points of connection of said bridge;

a voltage dividing circuit connected across said first and third points of connection of said bridge, said bridge outputting a first output measuring signal $S_1$ between said second point of connection and an intermediate connection point within said voltage dividing circuit, and outputting a second output measuring signal $S_2$ between said fourth point of connection of said bridge and said intermediate connection point within said voltage dividing circuit.

3. The device according to claim 1, wherein said first sections of said scale comprise engraved grooves and said second sections of said scale comprise bridges.

4. The device according to claim 1, wherein said first sections of said scale comprise perforations and said second sections of said scale comprise bridges.

5. The device according to claim 1, wherein said scale has a thickness of about 0.2 mm, a pitch of about 1 mm, and a protective film covering.

6. The device according to claim 1, wherein a distance between said scale and said four sensor elements is substantially 0.6 mm.

7. The device according to claim 1, comprising plural scale portions having different respective pitch values, said plural scale portions comprising one of (1) plural independent scales disposed in parallel with each other and (2) plural tracks disposed on a common scale in parallel with each other, said device further comprising a sensor for each of said plural scale portions.

8. The device according to claim 7, wherein one of said plural scale portions comprises a reference mark for use in determining an absolute position of said scale in relation to said sensor.

9. The device according to claim 1, wherein said scale comprises equally spaced rectangular grooves.

10. The device according to claim 1, wherein said scale is mounted to a blank tape comprising soft steel.

11. The device according to claim 10, wherein said scale is attached to said blank tape with an adhesive.

12. The device according to claim 10, wherein said tape has thickness and width dimensions substantially equal to thickness and width dimensions of said scale.

* * * * *